(12) United States Patent
Baumgarten et al.

(10) Patent No.: US 8,935,060 B2
(45) Date of Patent: Jan. 13, 2015

(54) DRIVER ASSISTANCE SYSTEM FOR AGRICULTURAL WORKING MACHINE

(71) Applicant: CLAAS Selbstfahrende Erntemaschinen GmbH, Harsewinkel (DE)

(72) Inventors: Joachim Baumgarten, Beelen (DE); Andreas Wilken, Bissendorf (DE); Sebastian Neu, Bad Laer (DE); Christoph Heitmann, Warendorf (DE); Christoph Bussmann, Harsewinkel (DE); Henner Voecking, Rietberg (DE); Boris Kettelhoit, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/942,832

(22) Filed: Jul. 16, 2013

(65) Prior Publication Data

US 2014/0019018 A1    Jan. 16, 2014

(30) Foreign Application Priority Data

Jul. 16, 2012  (DE) .......................... 10 2012 106 390
Jun. 13, 2013  (DE) .......................... 10 2013 106 131

(51) Int. Cl.
  *G06F 19/00*  (2011.01)
  *G05B 13/02*  (2006.01)
  *A01D 41/127*  (2006.01)
(52) U.S. Cl.
  CPC ............ *A01D 41/127* (2013.01); *G05B 13/021* (2013.01)

USPC ....... 701/50; 701/1; 701/23; 701/26; 460/114
(58) Field of Classification Search
  CPC .. A01B 69/007; A01B 41/127; A01B 43/085; A01B 43/087; G01C 21/20
  USPC ............................ 701/1, 23, 26, 50; 460/114
  See application file for complete search history.

(56) References Cited

U.S. PATENT DOCUMENTS

| 7,362,233 | B2 * | 4/2008 | Behnke et al. ................ 340/684 |
| 7,415,340 | B2 * | 8/2008 | Fitzner .............................. 701/50 |
| 7,630,808 | B2 * | 12/2009 | Behnke et al. ................... 701/50 |
| 7,670,218 | B2 * | 3/2010 | Behnke et al. ..................... 460/4 |
| 7,872,587 | B2 * | 1/2011 | Hindryckx et al. ........... 340/684 |

(Continued)

FOREIGN PATENT DOCUMENTS

| DE | 101 47 733 | 4/2003 |
| DE | 10 2006 044 628 | 4/2008 |

(Continued)

*Primary Examiner* — McDieunel Marc
(74) *Attorney, Agent, or Firm* — Michael J. Striker

(57) ABSTRACT

A driver assistance system for an agricultural working machine includes at least one control/regulating unit designed to adjust and monitor working parameters, quality parameters or both, of the agricultural working machine in an automatable manner based on use of a family of characteristics stored in the control/regulating unit. A selectable process implementation strategy is specified in order to automatically monitor or adjust at least one working parameter or quality parameter or both of the agricultural working machine. The driver assistance system suggests that the process implementation strategy be changed at least when the specified setpoint value of one or more of the quality parameters cannot be reached within the preselected process implementation strategy.

12 Claims, 5 Drawing Sheets

(56) References Cited

U.S. PATENT DOCUMENTS

| | | |
|---|---|---|
| 8,019,517 B2 * | 9/2011 | Boenig et al. .................. 701/50 |
| 8,406,964 B2 | 3/2013 | Baumgarten et al. |
| 8,428,830 B2 * | 4/2013 | Diekhans et al. ............... 701/50 |
| 2003/0066277 A1 * | 4/2003 | Behnke ...................... 56/10.2 R |
| 2006/0069485 A1 * | 3/2006 | Diekhans ...................... 701/50 |
| 2006/0123757 A1 * | 6/2006 | Baumgarten et al. ...... 56/10.2 R |
| 2009/0126327 A1 * | 5/2009 | Bussmann et al. ......... 56/10.2 A |
| 2012/0004812 A1 | 1/2012 | Baumgarten et al. |

FOREIGN PATENT DOCUMENTS

| | | |
|---|---|---|
| DE | 10 2009 009 767 | 8/2010 |
| DE | 10 2010 017 676 | 1/2012 |

* cited by examiner

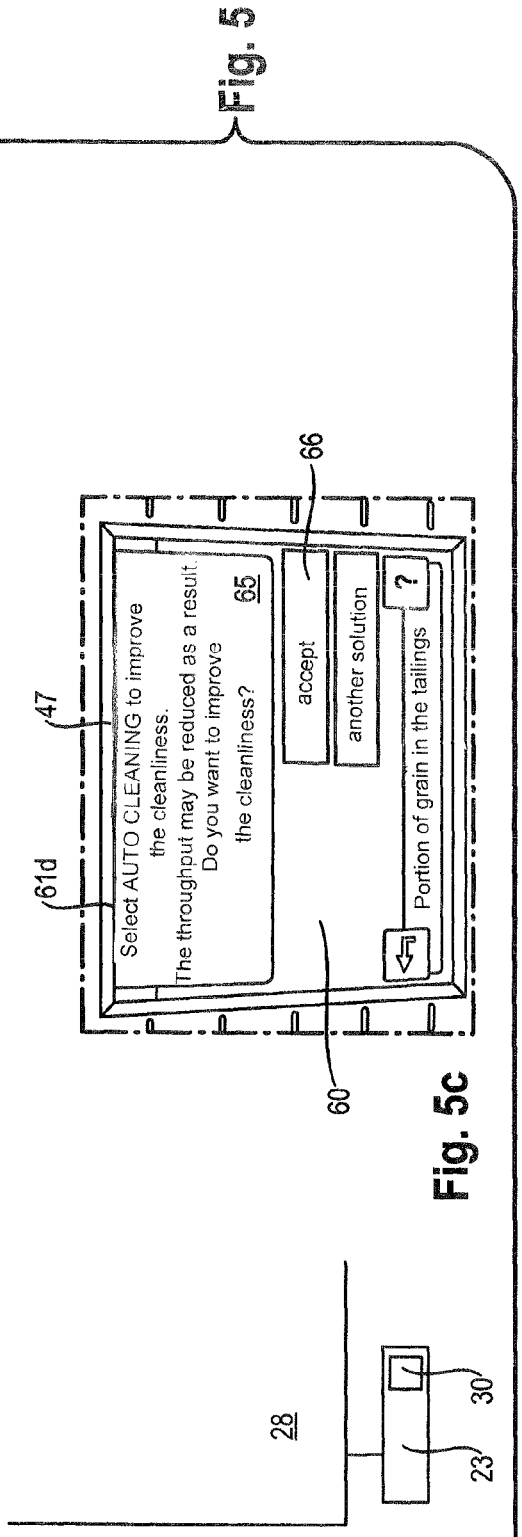
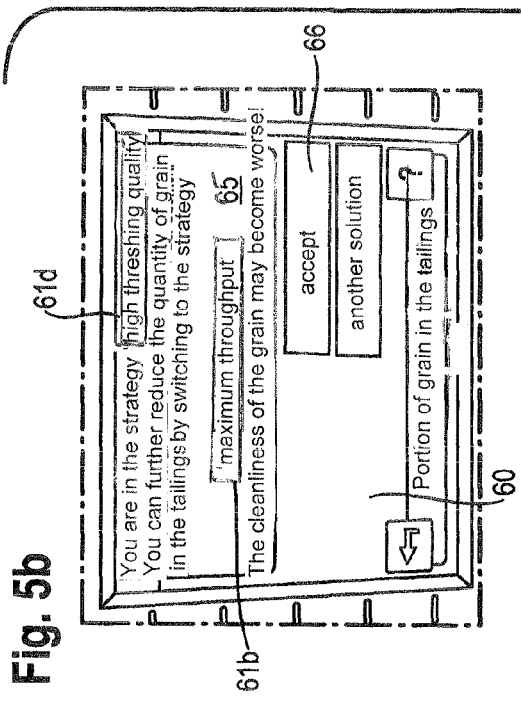
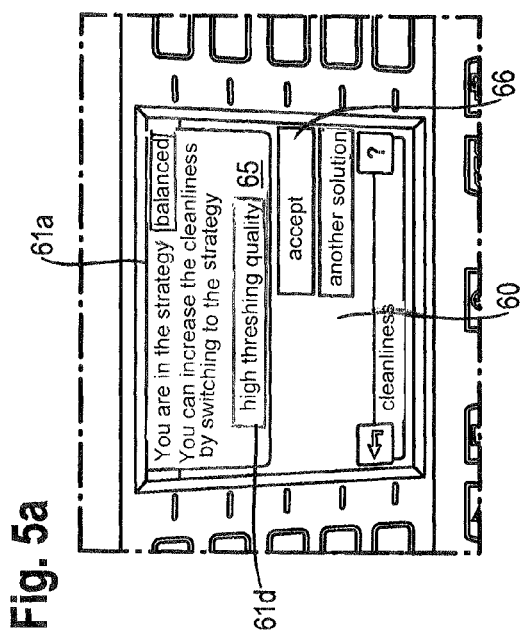

DRIVER ASSISTANCE SYSTEM FOR AGRICULTURAL WORKING MACHINE

CROSS-REFERENCE TO A RELATED APPLICATION

The invention described and claimed hereinbelow is also described in German Patent Application DE 10 2012 106397.0, filed on Jul. 16, 2012, and in German Patent Application DE 10 2013 106131.1, filed on Jun. 13, 2013. The German Patent Applications, subject matters of which are incorporated herein by reference, provide the basis for a claim of priority of invention under 35 U.S.C. 119(a)-(d).

BACKGROUND OF THE INVENTION

The invention relates to a driver assistance system for an agricultural working machine, comprising at least one control/regulating unit for adjusting and monitoring working parameters and quality parameters of the agricultural working machine in an automatable manner by use of a family of characteristics stored therein, where a selectable process implementation strategy is specified in order to automatically monitor or adjust (or both) at least one working or quality parameter of the agricultural working machine.

Monitoring and optimizing working and quality parameters of an agricultural working machine using a control/regulating unit is known. Document DE 10 2006 044 628, for example, presents a method for doing so in which a certain number of parameters is constantly optimized in relation to one another. This point-by-point regulation of machine parameters is developed, inter alia, in DE 10 2009 009 767, such that adjustable machine parameters are optimized depending on events. The operator of the agricultural working machine is thereby kept informed at all times about the ongoing optimization processes by a display unit.

In view of the fact that the known systems can optimize the working and quality parameters of an agricultural working machine in a highly precise manner, a regulating system has become known from DE 10 2010 017 676 that couples the selection of a suitable process implementation strategy to the intended use of the crop. The regulating system thereby ensures that the working and quality parameters are optimized only as precisely as necessary and not as precisely as possible. This simplifies the regulation and ensures that the crop throughput per unit of time can be maximized depending on the particular quality criteria.

These known optimization methods reach limits, however, when a satisfactory result cannot be achieved within a selected strategy. This is often the case when the properties of the crop to be harvested greatly deviate from the typically expected crop properties or when the condition of the territory to be worked (e.g. a sloped landscape), negatively affects the mode of operation of the working parts.

SUMMARY OF THE INVENTION

The present invention overcomes the shortcomings of known arts, such as those mentioned above.

To that end, the present invention provides a control/regulating unit for an agricultural working machine operation of which ensures that high-quality regulation of the agricultural working machine is made possible.

In one form, the invention embodies a driver assistance system for an agricultural working machine comprising at least one control/regulating unit. The control/regulating unit is designed to adjust and monitor working or quality parameters (or both) of the agricultural working machine in an automatable manner using a family of characteristics stored therein, where a selectable process implementation strategy is specified in order to automatically monitor or adjust (or both) at least one working or quality parameter of the agricultural working machine (or both). The driver assistance system suggests that the process implementation strategy be changed at least when the specified setpoint value of one or more of the quality parameters cannot be reached within the preselected process implementation strategy, which ensures that high-quality regulation of the agricultural working machine is made possible.

In an embodiment, the quality of the regulation result is further improved when the driver assistance system also suggests that the process implementation strategy be changed when values can be obtained for one or more of the quality parameters that are more favorable than the values defined by the specified setpoint value.

Particularly effective optimization of the quality parameters of an agricultural working machine results in that repeated interaction of the operator with the driver assistance system for the purpose of optimizing the same working or quality parameter (or both) prompts the driver assistance system to suggest that the process implementation strategy be changed.

Communication with the driver assistance system that is easily understood by the operator results when the communication with the driver assistance system is in the form of natural language.

Also, the effectiveness of the optimization of the working or quality parameters (or both) is further increased when the repeated interaction of the operator with the driver assistance system results in a shift of the weighting of at least one or more quality parameters.

The optimization of the mode of operation of the agricultural working machine induced by the driver assistance system is particularly effective when the selectable process implementation strategies include, at least, the "maximum throughput", "minimal fuel consumption", "high threshing quality" and "balanced" process implementation strategies.

In order to keep the operator of the agricultural working machine continuously informed about the effects of the optimization induced by the driver assistance system, the invention also provides that the effects on the mode of operation of the harvesting machine resulting from the process implementation strategy being changed are incorporated in the display of the driver assistance system in the form of natural language. Similar effects are achieved when a description of the suggested process implementation strategy can be depicted on the display of the driver assistance system in the form of natural language.

A complex optimization of the agricultural working machine is achieved, in an advantageous development of the invention, when the working parameters include machine parameter settings and crop parameters, and the quality parameters include the parameters "loss due to separation", "loss due to cleaning", "tailings", "volume of tailings", and "portion of grain in the tailings".

The operator of the agricultural working machine also is provided with a quick overview of the state of activation of the available automatic settings when, at the least, the families of characteristics describing the quality criteria are stored in automatic settings, wherein each automatic setting is visualized in the display unit using a pictogram and, the activation of an automatic setting is visualized by emphasizing the particular pictogram, and the deactivation of the particular automatic setting is visualized by hiding the particular pictogram.

In order to ensure that the agricultural working machine always makes optimal use of the resources available for making adjustments, the control/regulating unit can be automatically activated upon start-up of the working machine.

BRIEF DESCRIPTION OF THE DRAWINGS

Further features and advantages of the invention will become apparent from the description of embodiments that follows, with reference to the attached figures, wherein:

FIGS. 5a-c together depict various operating states of the driver assistance system according to the invention.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
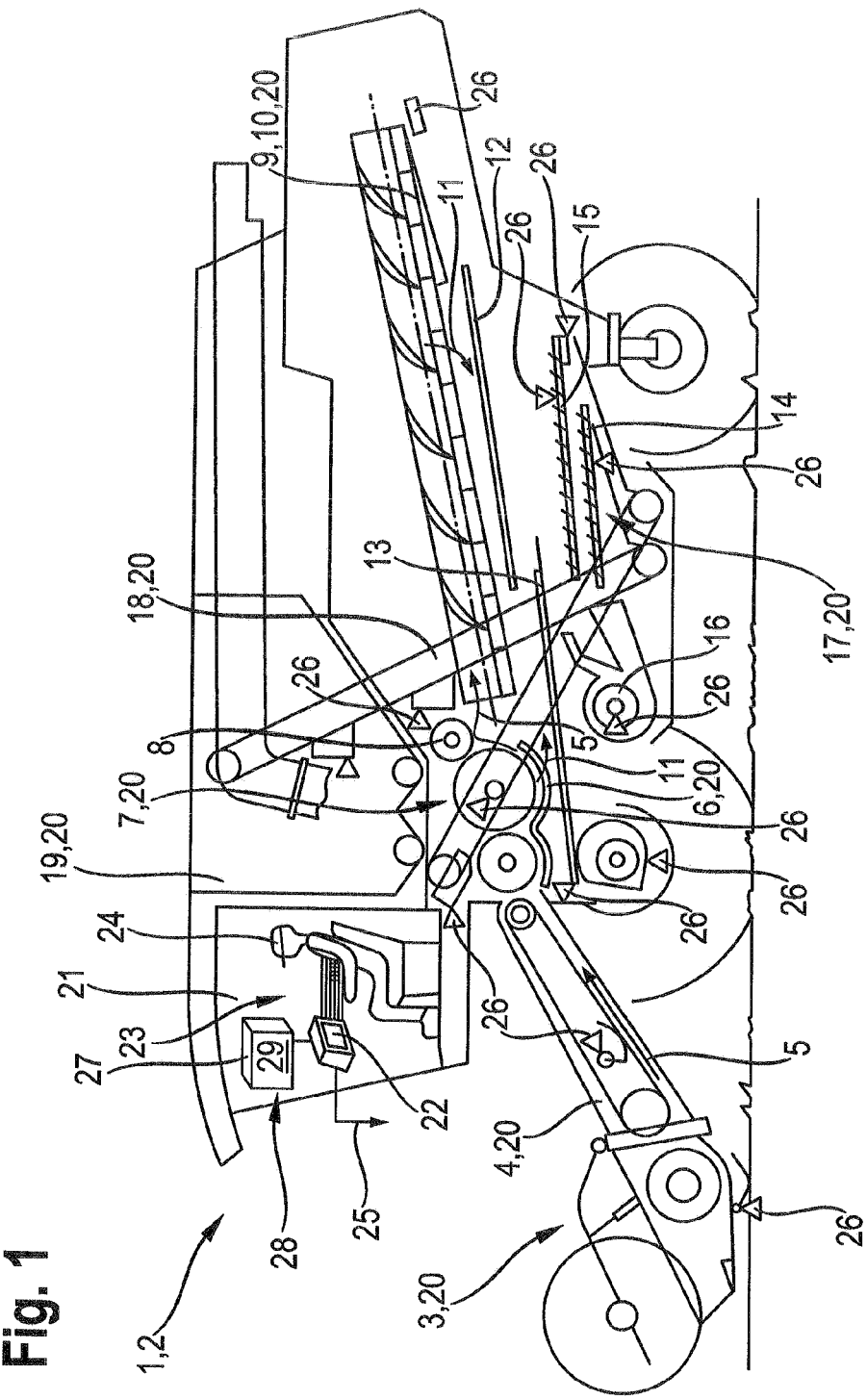
FIG. 1 depicts an agricultural working machine designed as a combine harvester that includes the inventive driver assistance system.

FIG. 1 depicts an agricultural working machine 1 designed as a combine harvester 2. The combine harvester/machine comprises a grain-cutting device 3 in the front region thereof, which is connected in a manner known per se to the feed rake 4 of the combine harvester 2. The crop flow 5 passing through the feed rake 4 is transferred in the upper, rear region of the feed rake 4 to the threshing parts 7 of the combine harvester 2, which are at least partially enclosed on the underside by the concave 6. A guide drum 8 disposed downstream of the threshing parts 7 redirects the crop flow 5 emerging from the threshing parts 7 in the rear region of these threshing parts such that the crop flow is transferred directly to a separating device 10 designed as a separating rotor 9. The crop flow 5 is conveyed in the rotating separating rotor 9 such that any unencumbered grains 11 contained in the crop flow 5 are separated out in the region underneath the separating rotor 9.

The separating device 10, which is designed as a separating rotor 9 in FIG. 1, also to be designed as a tray-type shaker, without deviating from the scope and spirit of the invention. The grains 11 that are separated out at the concave 6 and at the separating rotor 9 are directed via the return pan 12 and the feed pan 13 to a cleaning device 17 (which comprises a plurality of sieve levels 14, 15) and a fan 16. The cleaned flow of grain is then transferred via elevators 18 to a grain tank 19. The grain-cutting device 3, the feed rake 4, the threshing parts 7 and the concave 6 assigned thereto, the separating device 10, the cleaning device 17, the elevators 18, and the grain tank 19 are referred to in the following as the working parts 20 of the agricultural working machine 1.

The agricultural working machine 1 also comprises a driver's cab 21, in which at least one control/regulating unit 23 equipped with a display device 22 is disposed. The control/regulating unit 23 is used to control a plurality of processes, wherein the processes are initiated automatically or by the operator 24 of the agricultural working machine 1. The control/regulating unit 23 communicates via a bus system 25 in a manner known per se with a large number of sensor systems 26. The structure of the sensor systems 26 is described in detail in DE 101 47 733, the entire contents of which are hereby incorporated in the disclosure of this patent application.

In addition, the control/regulating unit 23 is coupled to a driver assistance system 28 comprising a display unit 27. The driver assistance system 28 also can be integrated directly in the control/regulating unit 23. Also, the information 29 provided by the driver assistance system may be visualized directly in the display unit 22 assigned to the control/regulating unit 23.

Figure 2:
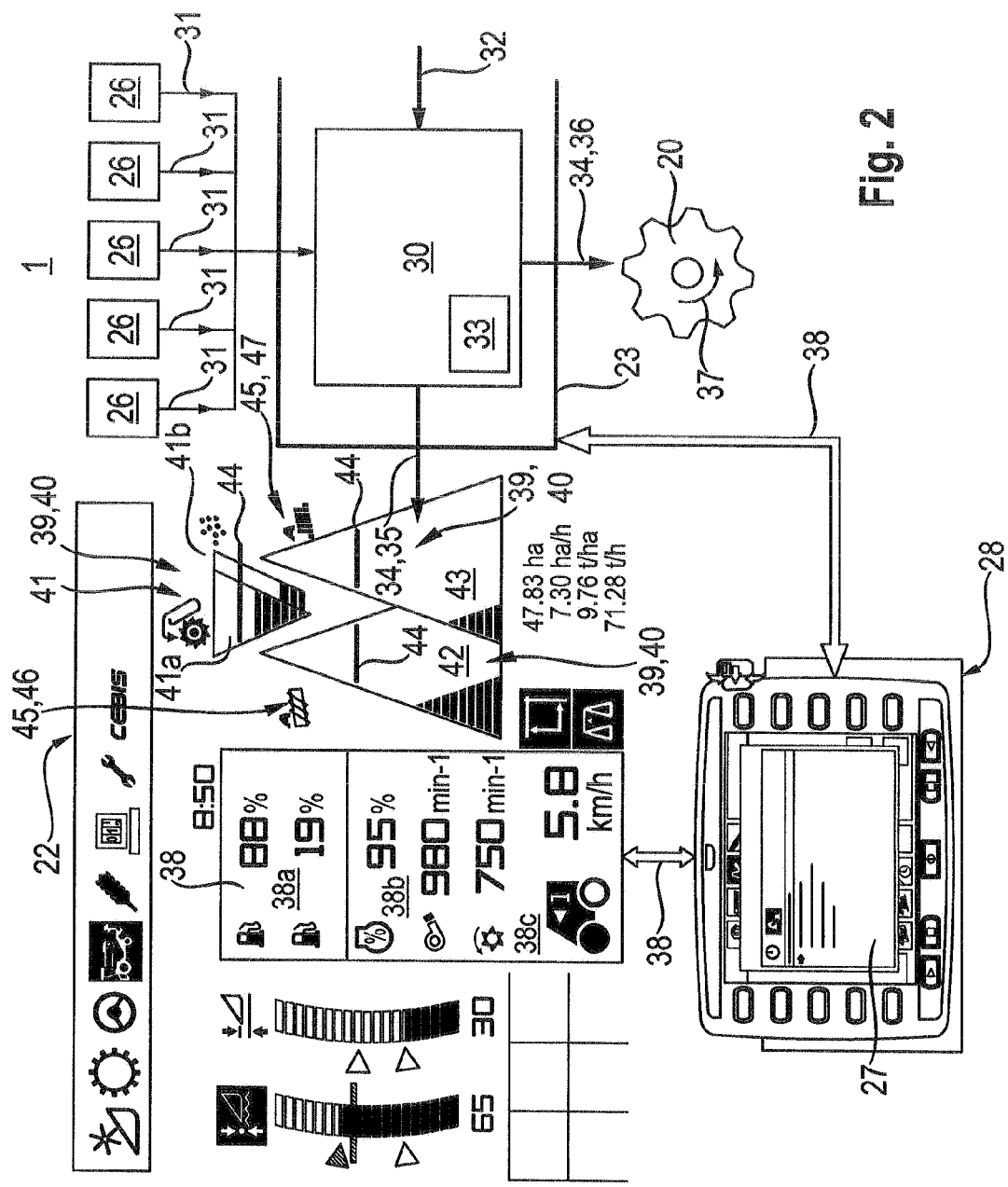
FIG. 2 depicts a display structure of a control/regulating unit according to the invention.

FIG. 2 depicts the display unit 22 of the control/regulating unit 23 and the arithmetic logic unit 30, which is assigned to the control/regulating unit 23 and is coupled to the display unit 22. The arithmetic logic unit 30 is designed to process internal information 31 generated by the sensor systems 26, as well as external information 32 and information 33 stored in the arithmetic logic unit 30 itself (such as expert knowledge), in order to generate a plurality of output signals 34. The output signals 34 include, at the least, display control signals 35 and working part signals 36, wherein the former determine the contents of the display unit 22 and the latter initiate the change of the highly diverse working parameters 37 of the working parts 20 of the agricultural working machine 1. Please note that arrow 37 symbolizes the cylinder speed.

In addition, the control/regulating unit 23 is coupled to a driver assistance system 28, as described above. The driver assistance system 28 is integrated in the agricultural working machine 1 such that this agricultural working machine can exchange data 38 with the control/regulating unit 23 and with the display unit 22 assigned thereto. The content of the display units 22, 27 depicted in FIG. 2 is provided as an example, where the invention is not limited to the specific example. The display unit 22 assigned to the control/regulating unit 23 comprises, in the central region thereof, a hotkey window 38. The hotkey window 38 is freely definable by the operator 24. Important machine information such as the fill level of the fuel tank 38a, machine parameter settings 38b, and the ground speed 38c are visualized in the hotkey window 38.

The display unit 22 comprises, in the right-side region thereof, display elements 39 for visualizing current values of certain quality parameters 40 of the agricultural working machine 1. In the embodiment shown, the display element 39 disposed at the top visualizes the "tailings" 41. The depiction on the left visualizes the "volume of tailings" 41a and the depiction on the right visualizes the "portion of grain in the tailings" 41b. The lower, left-hand display element 39 visualizes "losses due to separation" 42, i.e., the grain losses that leave the agricultural working machine 1 in the region thereof via the separating device 10 (which is designed as a separating rotor 9 or a tray-type shaker), and are not conveyed into the grain tank 19.

The lower, right-hand display element 39 visualizes the so-called "losses due to cleaning" 43, wherein the grain losses are displayed here that leave the agricultural working machine 1 via the cleaning device 17 in a manner similar to that of the separating device 10, and are not conveyed into the grain tank 19. Each of the display elements 39 also comprises a setpoint-value display mechanism 44, which is designed as a horizontal line and defines the maximum permissible loss of the particular quality parameter 40 previously defined by the operator 24. The setpoint-value display mechanism 44 permits the operator 24 to quickly recognize whether the quality of work being performed by the agricultural working machine 1 is sufficient.

Due to the complex interrelationships between highly diverse machine parameters 38a-c and at least the quality parameters 40, the possible settings for the separating device 10 and the cleaning device 17 are stored in automatic settings 45. In the embodiment shown (FIG. 2), an automatic separation setting 46 for optimizing the mode of operation of the separating device 10 and an automatic cleaning setting 47 for optimizing the mode of operation of the cleaning device 17 are programmed and stored in the control/regulating device 23. Each of the available automated automatic settings 45 also may be stored in entirety or in part in the driver assistance system 28.

Figure 3:
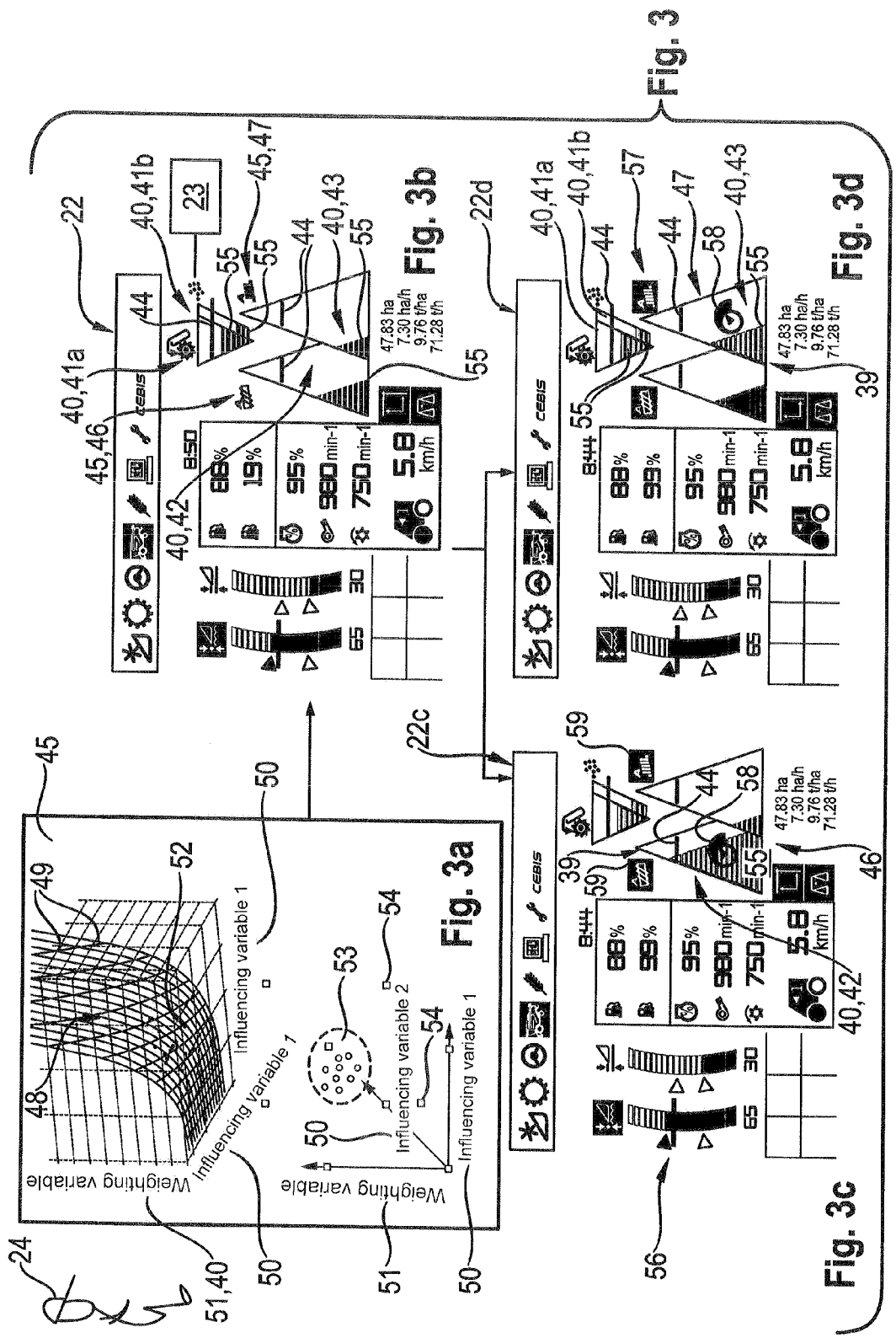
FIGS. 3a-3d together depict the display structure of the control/regulating unit in different operating situations.

FIGS. 3a-c describes the display unit 22 assigned to the control/regulating device 23 and the available automatic settings 45. FIG. 3a shows a schematic structure of the available automatic settings 45 to better illustrate the mode of operation thereof. The automatic separation setting 46 and the automatic cleaning setting 47 are defined by families of characteristics 48, as is the case for every automatic setting 45 provided for adjusting the working parts 20 of the agricultural working machine 1. The characteristic curves 49 forming a family of characteristics 48 describe various weighting variables 51 of the agricultural working machine 1 as a function of influencing variables 50. In the present case, the weighting variable 51 is the above-described quality parameter 40. In the exemplary embodiment shown, the influencing variables 50 include, at the least, the rotational speed of a separating device 10 designed as a separating rotor 9, the rotational speed of the fan 16 assigned to the cleaning device 17 and the opening width of the sieve levels 14, 15.

During operation of the agricultural working machine 1 (i.e. use of the combine harvester 2 for harvesting in this case), the operating points 52 that are ascertained are added directly to the family of characteristics 48. According to the illustration at the bottom of FIG. 3a, the agricultural working machine 1 often operates only in a small range 53 of the particular family of characteristics 48 that is stored. In order to ensure that the family of characteristics 48 stored in the control/regulating device 23 accurately depicts the particular separating or cleaning process to be modeled in the entire predefined range of values, measurement points 54 that are not located in the currently occupied region 53 of the particular family of characteristics 48 or, are not located in the boundary regions thereof (or both) are actuated at regular intervals. The effect thereof is that the separating or cleaning models stored in the automatic settings 45 also depict the particular process with sufficient accuracy in the boundary region of the families of characteristics 48 and in currently non-occupied regions of the particular family of characteristics 48.

If the agricultural working machine 1 (e.g., the combine harvester 2) is operated with the automatic separation setting 46 activated and the automatic cleaning setting 47 activated, the display unit 22 assigned to the control/regulating unit 23 has the above-described structure shown in FIG. 3b. The value of each quality parameter 40, specifically the "volume of tailings" 41a, the "portion of grain in the tailings" 41b, the "loss due to separation" 42 and the "loss due to cleaning" 43 in this case, is visualized qualitatively in the form of color-enhanced surface areas 55. The expansion of each of the surface areas 55 changes depending on the values for "loss due to separation" 42, "grain loss" 43 and "tailings composition" 41a, 41b ascertained by the control/regulating unit 23.

The purpose of the automatic settings 45 is to maintain the quality criteria 40 at an optimal level and below the particular setpoint-value display mechanism 44.

If a defined measurement point 54 must be actuated by the automatic settings 45, two activation states 56, 57 results for the exemplary embodiment described, as shown in FIGS. 3c and 3d. In one activation state 56 (FIG. 3c), the automatic separation setting 46 automatically actuates a measurement point 54, which is located outside of the currently occupied region 53 or in the boundary region of the family of characteristics 48 describing the grain separation at the separating device 10.

In order to ensure that the operator 24 of the agricultural working machine 1 is informed that the automatic separation setting 46 is actuating a measurement point 54 not located in the current working region 53, the surface area 55 visualizing the quality parameter 40 "loss due to separation" 42 in the display unit 22c appears to fade. In addition, it is possible for the size of the fading surface area 55 to be frozen or to continue visualizing the change in the "loss due to separation" 42. The latter variant keeps the operator 24 informed about the course of the change, which can also result in the "loss due to separation" 42 briefly exceeding the mark of the setpoint-value display mechanism 44 before a newly implemented state is reached.

In order to clearly signal to the operator 24 that a measurement point 54 not located in the current working range 53 has been optimized, the display element 39 visualizing the "loss due to separation" 42 is at least partially hidden by a characteristic symbol 58, while the partially hidden working and/or quality parameter 37, 40 is depicted passively, preferably in a fading manner.

Similarly, the structure of the display unit 22 in the further activation state 57 can be adapted as shown in FIG. 3d. In this case, the automatic cleaning setting 47 automatically actuates a measurement point 54 that is located outside the currently occupied region 53 or in the boundary region of the family of characteristics 48 describing the grain separation at the cleaning device 17.

In order to ensure that the operator 24 of the agricultural working machine 1 is informed that the automatic cleaning setting 47 is actuating a measurement point 54 not located in the current working region 53, the surface areas 55 visualizing the quality parameters 40 "loss due to cleaning" 43, "tailings volume" 41a, and "portion of grain in the tailings" 41b in the display unit 22c appear to fade. In addition, it is possible to freeze the size of the fading surface areas 55 or to continue visualizing the change in the "loss due to cleaning" 43, "tailings volume" 41a, and the "portion of grain in the tailings" 41b. The latter variant keeps the operator 24 informed about the course of the changes, which can also result in the "loss due to cleaning" 43, the "tailings volume" 41a and the "portion of grain in the tailings" 41b briefly exceeding the mark of the respective setpoint-value display mechanism 44.

In order to clearly signal to the operator 24 that a measurement point 54 not located in the current working range 53 has been optimized, the invention provides that at least the display element 39 visualizing the "loss due to cleaning" 43 is at least partially hidden by a characteristic symbol 58, while the partially hidden working or quality parameter 37, 40 (or both) is/are depicted passively, preferably in a fading manner.

Each of the available automatic settings 45 can be activated and deactivated independently of one another automatically or triggered by the operator 24, thereby making it possible to select any number of the simultaneously operating automatic settings 45. Preferably, all the automatic settings 45 are always activated in order to optimize the mode of operation of the agricultural working machine 1. Also, the invention provides for an automatic setting 45 to be intentionally shut off, in that the operator 24 enters a defined value in order to deliberately change a working parameter 37. If the operator 24 implements the over-ride during the specific actuation of measurement points 54, the characteristic symbols 58 are hidden and the depiction of the working and/or quality parameters 37, 40 (which may be fading), is eliminated. In this context it is possible for the operator 24 to be explicitly notified via the display unit 22 when automatic settings 45 are deactivated.

The control/regulating unit 23 always visualizes the change of the quality parameters 40 independently of whether automatic settings 45 are activated or not. Accordingly, the pictograms 59 representing the automatic settings 45 are positioned in the display unit 22 and are visualized in an at least color-enhanced manner when the automatic setting 45 is active. Similarly, the deactivation of the particular automatic setting 45 is visualized by hiding the particular pictogram 59.

Also, each automatic setting 45 comprises a separate family of characteristics 48, wherein individual automatic settings 45 can also induce an optimization of the mode of operation of the agricultural working machine 1 via incorporation of several families of characteristics 48. In the exemplary embodiment shown, the automatic cleaning setting 47 considers the families of characteristics 48, which take into account the "loss due to cleaning" 43, the "tailings volume" 41a and the "portion of grain in the tailings" 41b.

In order to ensure that the families of characteristics 48 taken into account deliver useful values for the weighting variables 51 and, therefore for an optimal mode of operation of the agricultural working machine 1 even when the influencing variables 50 fluctuate, measurement points 54 not located in the current working region 53 or in the boundary regions of the families of characteristics 48 are actuated in defined time intervals and, the number of measurement points 54 is limited.

Preferably, the number of specifically actuatable measurement points 54 is limited to four. The defined time intervals (within which the various measurement points 54 are repeatedly actuated), are designed such that the duration of the time interval increases as the operating time of the agricultural working machine 1 increases and, at the beginning of the operating period, is less than 15 minutes and increases to 30 minutes as the operating time increases. The control/regulating mechanism 23 and, therefore, the automatic settings 45 also are automatically activated upon start-up of the agricultural working machine 1. In this context it is provided that, when the automatic settings 45 are inactive, a notice to the operator 24 is generated stating that efficiency can be increased by activating the particular automatic setting 45.

Figure 4:
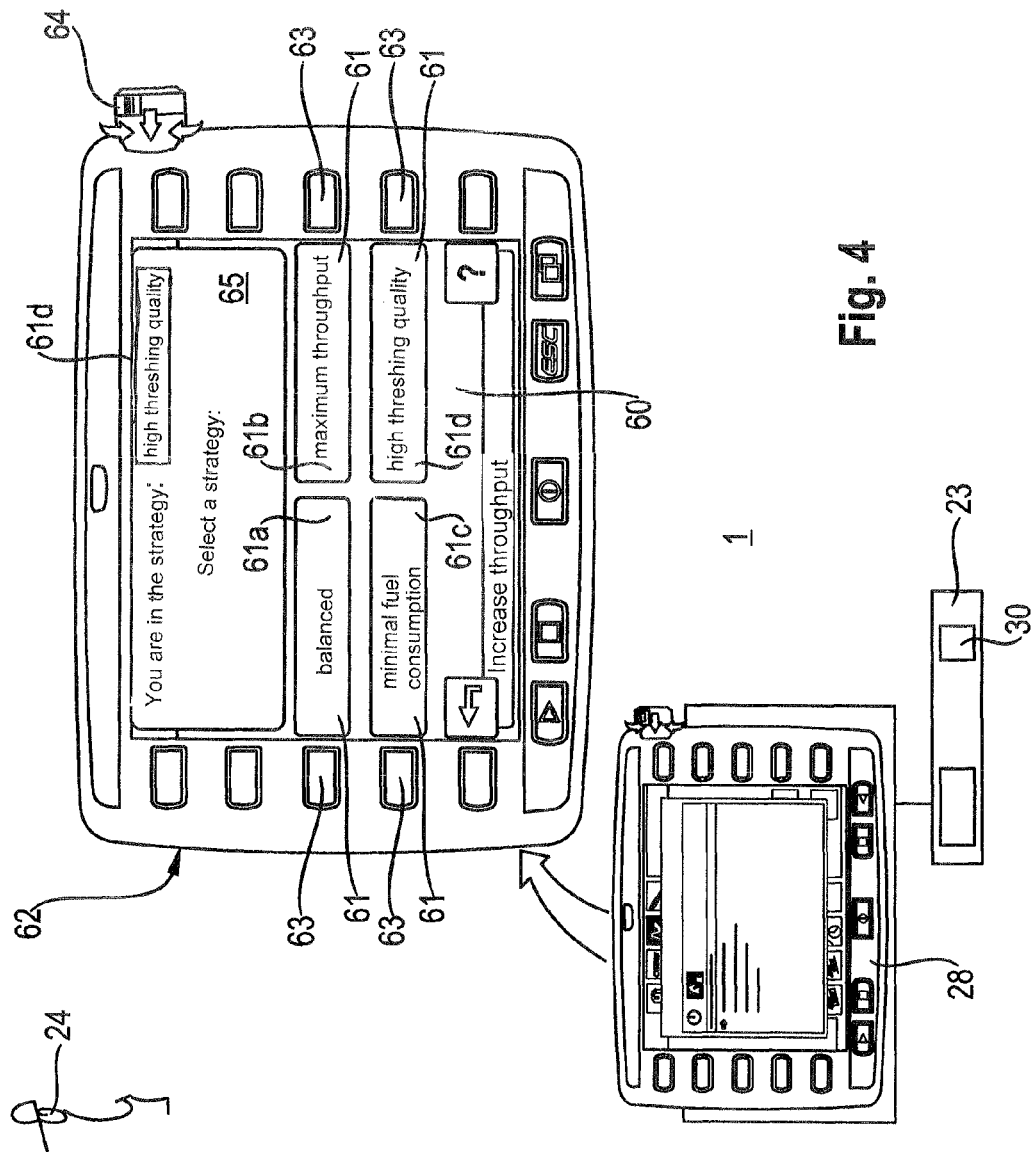
FIG. 4 depicts the driver assistance system according to the invention.

FIG. 4 presents a detailed view of the driver assistance system 28 according to the invention. The available process implementation strategies 61 are initially visualized in the display 60 associated with the driver assistance system. In the exemplary embodiment shown, four process implementation strategies 61, for example, can be selected, namely "balanced" 61a, "maximum throughput" 61b, "minimal fuel consumption" 61c and "high threshing quality" 61d.

If the "maximum throughput" 61b process implementation strategy is selected, the driver assistance system 28 regulates the mode of operation of the agricultural working machine 1 such that the predefined setpoint values for a permissible grain loss (which comprises loss due to separation 42 and loss due to cleaning 43), are adhered to for the maximum possible throughput. If the "minimum fuel consumption" 61c process implementation strategy is selected, the driver assistance system 28 regulates the mode of operation of the agricultural working machine 1 such that the demand for drive energy is reduced. This is achieved by reducing the rotational speed of one or more working parts 20. If the driver assistance system 28 operates using the "high threshing quality" 61b process implementation strategy, the objective is to minimize grain loss, the amount of damaged grain and the portion of admixtures in the harvested grain. The "balanced" 61a regulating strategy considers moderate levels for all optimizable working and/or quality parameters 37, 40, thereby resulting in a balanced mode of operation of the agricultural working machine 1 overall without assigning priority to any particular working and quality parameters 37, 40.

Depending on the design of the housing 62 accommodating the driver assistance system 28 and the display 60, each of the process implementation strategies 61 can be selected via touchscreen function when the display 60 is designed as a touchscreen monitor, or can be activated via a button 63 assigned to the particular process implementation strategy 61. The particular process implementation strategy 61 may also be activatable via a rotate-and-press switch 64. A viewing window 65 is positioned in the upper region of the display 60, which contains natural-language comments and, in FIG. 4, indicates which process implementation strategy 61 is currently activated.

According to the preceding descriptions, the driver assistance system 28 is coupled to the control/regulating unit 23 assigned to the agricultural working machine 1. Hence, it also is feasible for the driver assistance system 28 and the control/regulating unit 23 to be combined in a single assembly in a non-illustrated manner. After the operator 24 has selected a first process implementation strategy 61, the various working and quality parameters 37, 40 are optimized in the above-described manner on the basis of the stored families of characteristics 48 defined by characteristic curves 49. If the arithmetic control unit 30 assigned to the control/regulating unit 23 determines that limit values defined within a selected process implementation strategy 61 cannot be maintained for one or more of the quality parameters 40, or could be even lower than specified, the driver assistance system 28 suggests that the process implementation strategy 61 be changed.

FIGS. 5a-c show various scenarios for a suggestion to change the process implementation strategy 61. In FIG. 5a, the driver assistance system 28 suggests, in the form of natural language in the viewing window 65 assigned to the display 60, that the process implementation strategy be changed from "balanced" 61a to "high threshing quality" 61d in order to improve the cleanliness of the grain. Similarly, FIG. 5b shows how the driver assistance system 28 suggests, in the form of natural language, that the process implementation strategy be changed from "high threshing quality" 61d to "maximum throughput" 61b in order to reduce the amount of grain in the tailings. This dialog is visualized in the viewing window 65 assigned to the display 60.

FIG. 5c shows a dialog in which the driver assistance system 28 suggests that the automatic cleaning setting 47 be activated, wherein the automatic cleaning setting 47 is a component of the "high threshing quality" 61d process implementation strategy. According to the invention, the driver assistance system 28 suggests that the process implementation strategy 61 be changed when the specified setpoint values of one or more quality parameters 40 cannot be reached within the selected process implementation strategy 61, or when the driver assistance system 28 recognizes that better values can be reached for one or more of the quality parameters 40 if a different process implementation strategy 61 is selected.

If the operator 24 of the agricultural working machine 1 wants to accept the change to the process implementation strategy 61 suggested by the driver assistance system 28, the operator confirms this by activating an "accept" field 66. The optimization process activated as a result is based on an interaction of the operator 24 with the driver assistance system 28. During the optimization process, the changes to the working parameters 37 induced by the driver assistance system 28 and the effects thereof on the particular quality parameter 40 are displayed to the operator 24 via the display unit 22 of the control/regulating unit 23, in accordance with the descriptions of FIGS. 2 and 3.

The driver assistance system 28 is designed such that the operator 24 must evaluate the results of the optimization. The optimization process is continued or terminated depending on the operator's evaluation. The operator 24 is notified of the effects on the mode of operation resulting from the process implementation strategy being changed via the additional display of comments in the form of natural language, e.g., related to the influence on certain quality parameters 50, in the particular viewing window 65. In addition, a description of the suggested process implementation strategy 61 can be called up manually and displayed, or can be displayed automatically in order to provide the operator 24 with an opportunity to compare the currently selected process implementation strategy with the suggested process implementation strategy 61.

A further aspect of the evaluation of the interaction of the operator 24 with the driver assistance system 28 is that repeated interaction relating to the same optimization goal is ascertained. This finding is used to increase the weighting of this optimization goal within the optimization process, in order to ensure that repeated interaction of the operator 24 with the driver assistance system 28 for the purpose of optimizing the same working and/or quality parameter 37, 40 prompts the driver assistance system 28 to suggest that the process implementation strategy 61 be changed.

LIST OF REFERENCE CHARACTERS

1 agricultural working machine
2 combine harvester
3 grain-cutting device
4 feed rake
5 crop flow
6 concave
7 threshing part
8 guide drum
9 separating rotor
10 separating device
11 grain
12 return pan
13 feed pan
14 sieve level
15 sieve level
16 fan
17 cleaning device
18 elevator
19 grain tank
20 working part
21 driver's cab
22 display unit
23 control/regulating unit
24 operator
25 bus system
26 sensor system
27 display unit
28 driver assistance system
29 information
30 arithmetic logic unit
31 internal information
32 external information
33 information
34 output signal
35 display signal
36 working part signal
37 working parameter
38 hotkey window
39 display element
40 quality parameter
41 tailings
41a volume of tailings
41b portion of grain in the tailings
42 loss due to separation
43 loss due to cleaning
44 setpoint-value display mechanism
45 automatic setting
46 automatic separation setting
47 automatic cleaning setting
48 family of characteristics
49 characteristic curve
50 influencing variable
51 weighting variable
52 operating point
53 region
54 measurement point
55 surface area
56 controlled condition
57 controlled condition
58 characteristic symbol
59 pictogram
60 display
61 process implementation strategy
62 housing
63 button
64 rotate-and-press switch
65 viewing window
66 "accept" field As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following clams so limit that.

What is claimed is:

1. A driver assistance system for an agricultural working machine, comprising
    at least one control/regulating unit including a memory and which adjusts and monitors working parameters, quality parameters or both of the agricultural working machine in an automatable manner using a family of characteristics stored in the memory, and enables that a selectable process implementation strategy is specified in order to automatically monitor and/or adjust at least one working parameter, quality parameter or both of the agricultural working machine,
    wherein the driver assistance system (28) suggests that the process implementation strategy (61) be changed at least when the specified setpoint value of one or more of the quality parameters (40) cannot be reached within the preselected process implementation strategy (61).

2. The driver assistance system according to claim 1, wherein the driver assistance system (28) also suggests that the process implementation strategy (61) be changed when values can be obtained for one or more of the quality parameters (40) that are more favorable than the values defined by the specified setpoint value.

3. The driver assistance system according to claim 1, wherein repeated interaction of the operator (24) with the driver assistance system (28) for the purpose of optimizing the working parameter (37) or the quality parameter (40) or both prompts the driver assistance system (28) to suggest that the process implementation strategy (61) he changed.

4. The driver assistance system according to claim 1, wherein the communication with the driver assistance system (28) is in the form of natural language.

5. The driver assistance system according to claim 1, wherein repeated interaction of the operator (24) with the driver assistance system (28) results in a shift of the weighting of at least one or more quality parameters (40).

6. The driver assistance system according to claim 1, wherein the selectable process implementation strategies (61) include any of the group process implementation strategies consisting of a "maximum throughput" (61b), a "minimal fuel consumption" (61c), a "high threshing quality" (61d) and a "balanced" (61a).

7. The driver assistance system according to claim 1, wherein effects on a mode of operation of the agricultural working machine (1) resulting from the process implementation strategy (61) being changed are incorporated in the display (60) of the driver assistance system (28) in the form of natural language.

8. The driver assistance system according to claim 1, wherein a description of the suggested process implementation strategy (61) is depicted on the display (60) of the driver assistance system (28) in the form of natural language.

9. An agricultural working machine according to claim 1, wherein the working parameters (37) can include machine parameter settings (38b) and crop parameters.

10. The agricultural working machine according to claim 9, wherein the quality parameters (40) include parameters from the group consisting of "loss due to separation" (42), "loss due to cleaning" (43), "tailings" (41), "volume of tailings" (41a) and "portion of grain in the tailings" (41b).

11. The agricultural working machine according to claim 9, wherein the families of characteristics (48) describing the quality criteria (40) are stored in automatic settings, wherein each automatic setting (48) is visualized in the display unit (22) by a pictogram (59, wherein the activation of an automatic setting (45) is visualized by emphasizing the particular pictogram (59) and wherein the deactivation of the particular automatic setting (45) is visualized by hiding the particular pictogram (59).

12. The agricultural working machine according to claim 1, wherein the control/regulating unit (23) is automatically activated upon start-up of the working machine (1).

\* \* \* \* \*